United States Patent [19]

Pierce

[11] Patent Number: 4,796,242
[45] Date of Patent: Jan. 3, 1989

[54] SCANNING OPTICAL CARD READER

[75] Inventor: Gerald A. Pierce, Redwood City, Calif.

[73] Assignee: Drexler Technology Corporation, Mountain View, Calif.

[21] Appl. No.: 628,729

[22] Filed: Jul. 9, 1984

Related U.S. Application Data

[63] Continuation-in-part of Ser. No. 541,166, Oct. 12, 1983, abandoned.

[51] Int. Cl.⁴ ............................................. G11B 7/085
[52] U.S. Cl. ........................................ 369/32; 235/470
[58] Field of Search .................. 369/32, 46; 250/568, 250/569; 235/454, 456, 458–462, 470, 471, 463, 475–481, 485, 487; 360/2; 382/67

[56] References Cited

U.S. PATENT DOCUMENTS

| | | | |
|---|---|---|---|
| 3,149,529 | 9/1964 | Critchlow | 235/471 |
| 3,622,760 | 11/1971 | Chumley | 235/459 X |
| 3,639,729 | 2/1972 | Marshall | 235/481 |
| 3,639,730 | 2/1972 | Higginbotham et al. | 235/476 |
| 3,727,195 | 4/1973 | McLaughlin | 369/32 |
| 3,737,883 | 6/1973 | Sordello et al. | |
| 3,848,095 | 11/1974 | Wohlmut et al. | 369/46 |
| 3,864,550 | 2/1975 | Cragon | 235/485 |
| 3,920,957 | 11/1975 | Sims | |
| 3,946,205 | 3/1976 | Melugin et al. | 235/476 |
| 3,946,367 | 3/1976 | Wohlmut et al. | 369/32 |
| 4,105,926 | 8/1978 | Reno et al. | 250/568 |
| 4,135,663 | 1/1979 | Nojiri et al. | 235/463 |
| 4,285,012 | 8/1981 | Ohara et al. | |
| 4,356,513 | 10/1982 | Yoshimura et al. | 235/454 |
| 4,360,728 | 11/1982 | Drexler | 235/462 |
| 4,397,010 | 8/1983 | Nabeshima | |
| 4,398,223 | 8/1983 | Lemelson | 369/32 |
| 4,634,850 | 1/1987 | Pierce et al. | 235/487 |

FOREIGN PATENT DOCUMENTS 828747 2/1960 United Kingdom.
912328 12/1962 United Kingdom.

Primary Examiner—Raymond F. Cardillo
Assistant Examiner—Steven R. Garland
Attorney, Agent, or Firm—Thomas Schneck

[57] ABSTRACT

An optical data card random access information system featuring a data card with data tracks transverse to the lengthwise direction of motion of the card in a transport. An electromechanical actuator, having an arm parallel to the tracks, supports a light source for illuminating a track as well as a charge coupled device linear array detector for reading data. Light is directed onto a desired track to be read and preferably the entire track is imaged onto elements of the detector array so that an entire track may be read simultaneously. The card is supported by a carriage which advances the card in the card's lengthwise direction under control of a motor. The lengthwise motion of the card places any desired track under the actuator arm, while crosswise motion of the arm is able to place the track within the field of view of the detector.

4 Claims, 4 Drawing Sheets

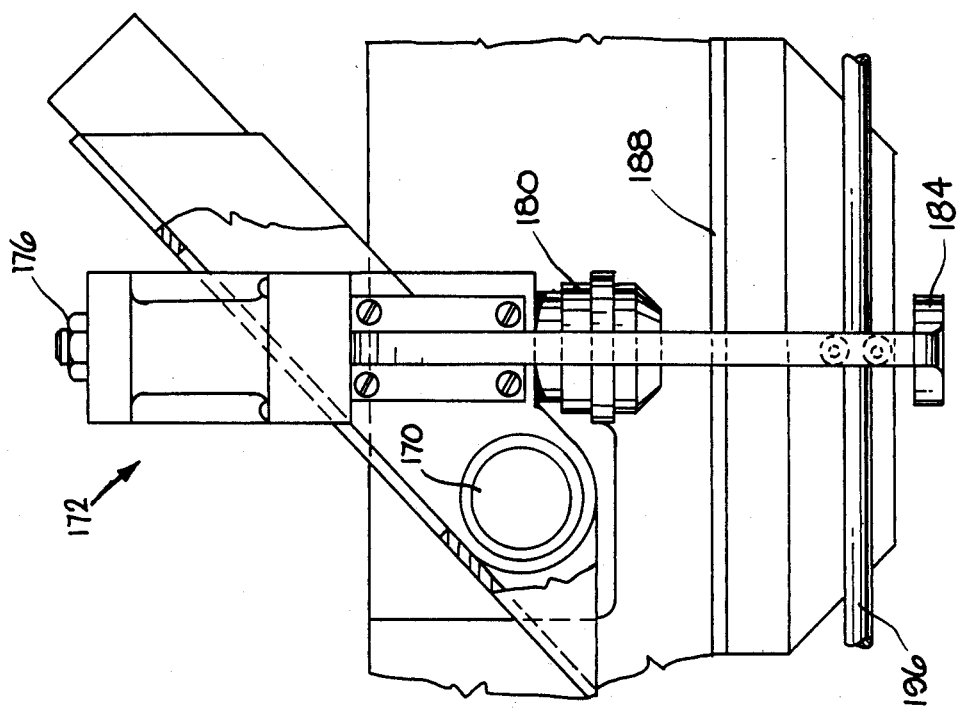
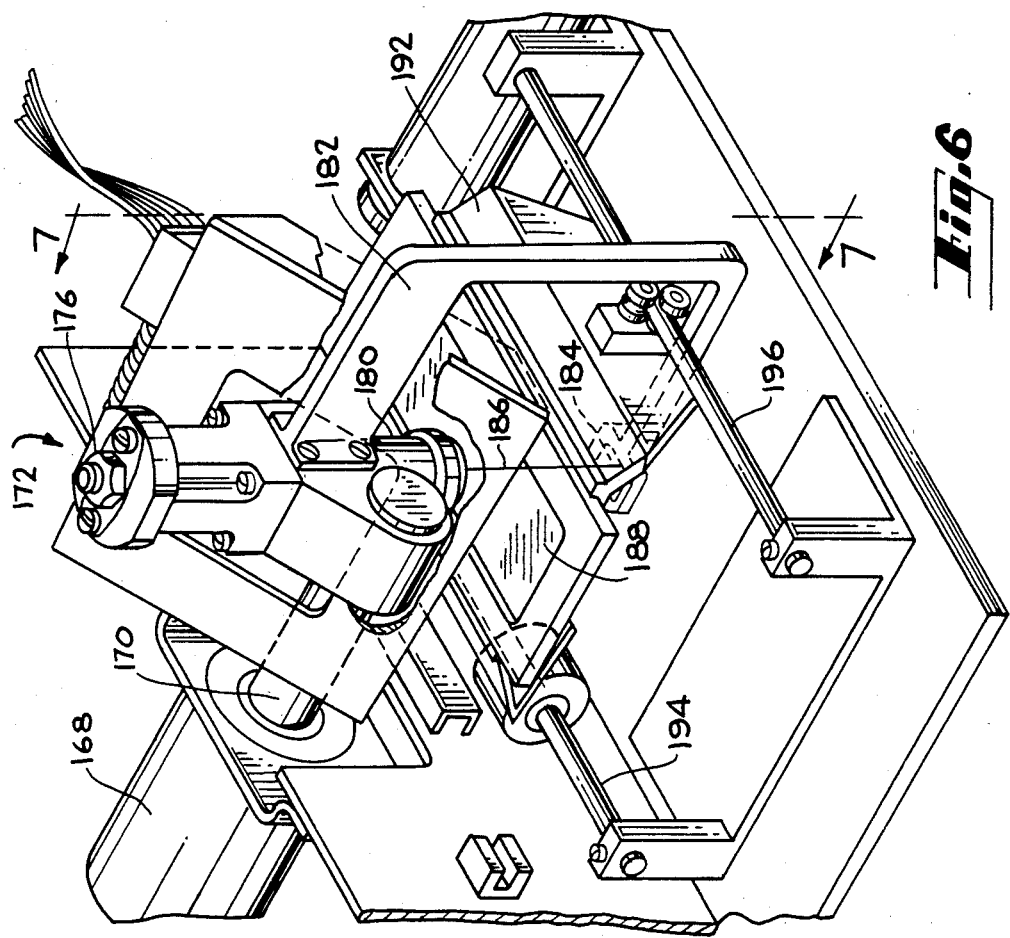

SCANNING OPTICAL CARD READER

CROSS-REFERENCE TO RELATED APPLICATION

This application is a continuation-in-part of U.S. patent application Ser. No. 541,166, filed Oct. 12, 1983, now abandoned.

DESCRIPTION

1. Technical Field

The invention relates to optical information reading and writing, particularly on cards or the like.

2. Background Art

One prior approach to high-speed optical reading and writing on a flat surface involves laser scanners. Laser scanners for flat objects, such as cards, sometimes employ a scanning mirror to deflect a light beam over a line pattern on the surface. As the card is moved in a direction perpendicular to the line pattern, successive lines may be scanned. An example of such a scanner system may be found in U.S. Pat. No. 4,285,012 to Ohara, et al.

The system shown in the above-mentioned patent is useful for scanning a complete card. However, a problem is encountered in attempting to use the system for random access of information on the card. Typically, a scanning mirror is not adapted for stopping in the middle of a scan for locating desired information. Rather, entire lines must be read one at a time, until desired information is reached.

In the field of magnetic disk storage it is known that digital data, magnetically recorded on a disk can be accessed very rapidly using a random access approach. For example, in U.S. Pat. No. 3,737,883 to Sordello et al. there is an example of a random access head positioning apparatus for a magnetic disk. The patent teaches use of an electromechanical actuator for positioning magnetic heads at a desired location.

Analogous to the case of magnetic disk storage, others have used servo techniques for positioning a beam on an optical disk. For example, in U.S. Pat. No. 4,397,010 to Nabeshima teaches a servo controlled scanning mirror for an optical disk. While there is some similarity to the magnetic case, the optical version is used for track following and not for random access of information.

One of the problems in attempting to adapt an optical system to the random access techniques of magnetic recording is that the optical components have been too large to attempt to build the optical equivalent of a magnetic recording head. Magnetic heads are very small and low mass. Accordingly, they are easily movable by electromechanical actuators.

An object of the invention has been to devise a random access optical data system, especially for flat articles. Such access would locate desired information without scanning the entire card surface.

DISCLOSURE OF INVENTION

The above object has been met with an optical data card random access information system featuring a card transport advancing a card in the card's lengthwise direction. The card has data written in tracks transverse to the lengthwise direction. An electromechanical actuator, having an arm parallel to the tracks, supports a light source for reading data, address and control bits in the tracks. Information in the tracks is read by a CCD linear array, associated with the actuator, aligned so that a track is imaged onto the array, thereby instantaneously recording in the electronics all of the information in a track. After reading the data in one track, another track is ready for observation. This is in contrast to the prior art, where data is usually read serially, one bit at a time.

The actuator allows the detector to be repositioned in the event that skew is detected in the data, arising perhaps from misalignment of the card in the carriage. A motor positions the card in the proper lengthwise position below the actuator arm where the CCD array can read the desired track. The coordinated action of the two motors, one finding the proper track amidst the lengthwise track array, the other positioning the detector laterally to read a track, provides a novel, high-speed random-access optical data card read/write system.

BRIEF DESCRIPTION OF THE DRAWINGS

FIG. 6 is a perspective view of a transmissive optical card reader in accord with the present invention.

FIG. 7 is a side view of a detail of the transmissive optical card reader taken along lines 7—7 in FIG. 6.

BEST MODE FOR CARRYING OUT THE INVENTION

Figure 1:
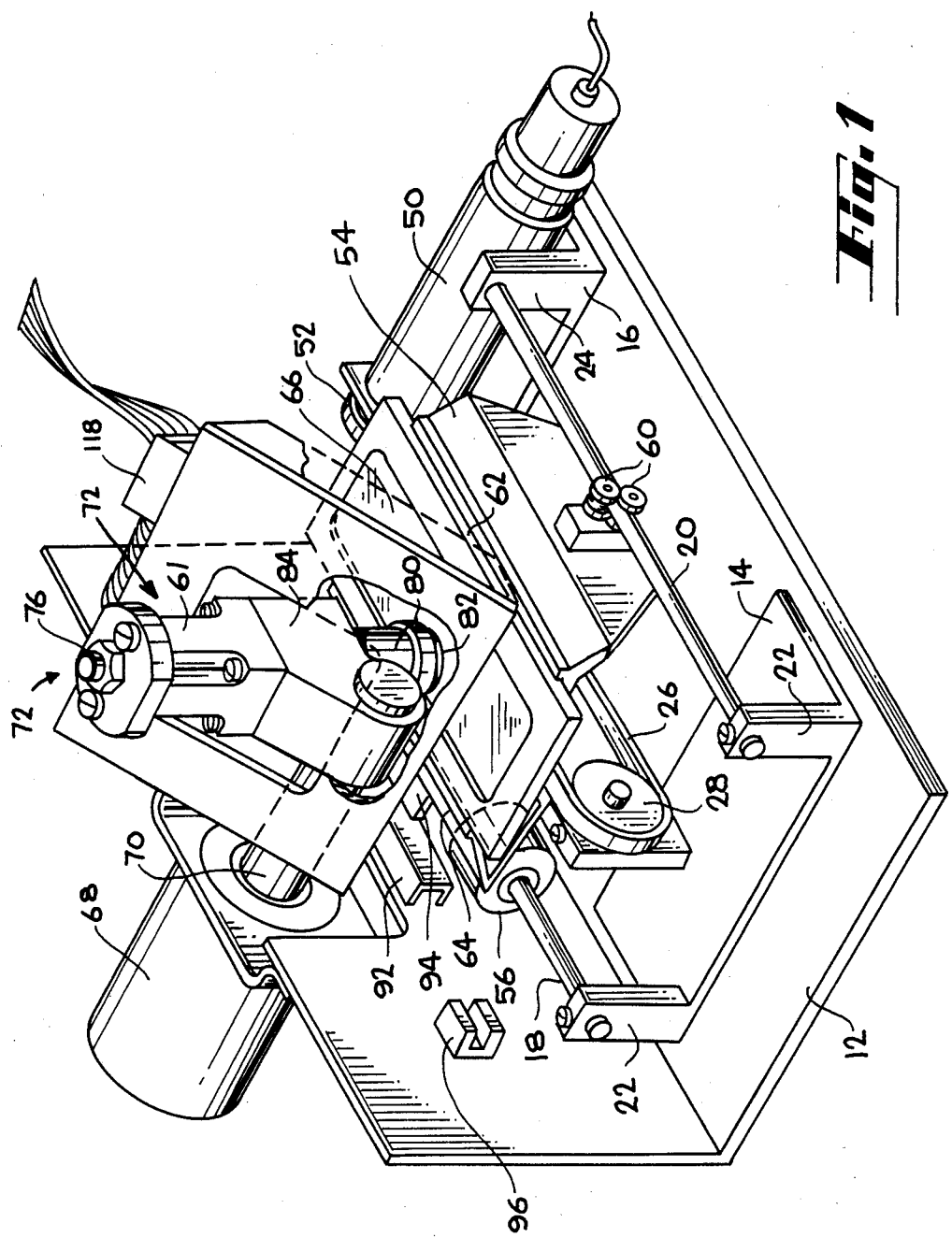
FIG. 1 is a perspective view of a reflective optical card reader in accord with the present invention.
Figure 1A:
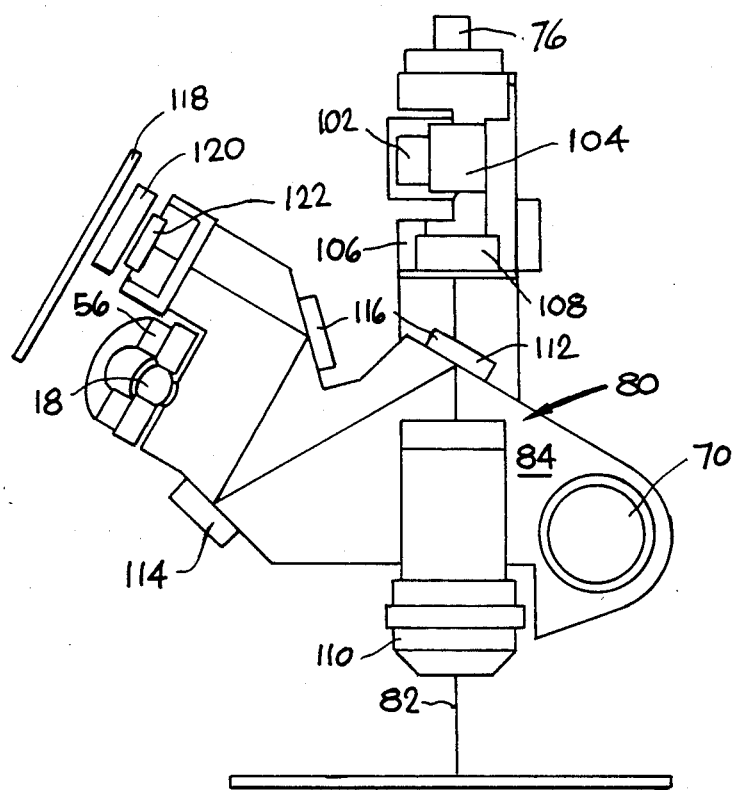
FIG. 1a is a side plan view of the card reader shown in FIG. 1.

With reference to FIGS. 1 and 1a, a base plate 12 supports a frame having frame members 14 and 16, mutually spaced apart, but connected by parallel rails 18 and 20. The rails are supported by upright arms 22 and 24. The frame also supports a drive belt 26 which is trained over idler pulley 28 and driven by a digital stepper motor 50 through a drive pulley 52. Drive belt 26 is fixed to a movable carriage 54 which is carried on rails 18 and 20. On one side, the carriage is supported over the rails by annular bearings 56, while on the other side guide bearings 60 are connected to either side of rail 20.

The top of carriage 54 is flat, with a space defined between opposed ridges 62 and 64 for supporting a data card 66. The data card is intended to fit snugly between the ridges so that once it is in position, it cannot move about. Data card 66 has a strip of optically written information in tracks which are transverse, or more particularly, perpendicular, to the direction of motion of belt 26. These transverse tracks have pits, spots or marks on the order of a few microns to 50 microns, intended to be read by reflection or transmission of light incident to the spots. Each transverse row of data is a track, which may be in one of several lengthwise bands of data tracks, explained more fully below. This is in contradistinction to the usual designation wherein tracks are written in the longitudinal direction. One of the novel aspects of the present invention is that the data tracks remain stationary while the optical detector, positioned over the track, reads a whole track at one time while it also remains stationary.

An electromagnetic actuator 68 supports a movable arm 70 on which the optics assembly 72, including the laser 76 and a detector, are mounted. While a laser is shown and described, other types of light sources may be used, including white light, light emitting diodes, or other solid state devices. The optics assembly receives a cantilever support from the movable arm 70 which is drawn in and out of the housing for actuator 68. Actuator 68 need not be a fast device, as in high-speed magnetic disk drives, because most of the time, the actuator arm does not move. Accurate lateral positioning of the actuator is not required because the detector images a lateral data pattern exceeding a track in length. The excess width allows for slight misalignments. The amount of excess is optional, but ±50% of a track length, on each side of a track is a reasonable amount.

If the belt 26 is considered to move the carriage, and hence card 66, in the X direction, actuator arm 70 may be considered to move optics assembly 72 in the Y direction. By cooperative motion of motor 50 as well as actuator arm 70, any data spot on the card may be considered to have X, Y coordinates which can be located so that the data spot may be read by the optics.

The position of actuator arm 70 may be measured. However, it need not be measured because position information may be encoded on card 66. For example, the beginning of a track, as well as the end of a track, is usually marked. Additionally, tracks may have special data portions which indicate proper track following, just as magnetic tracks often encode guide data for a magnetic head. Thus, data from the card may indicate whether a particular track has been located, the beginning of the track, and whether the track is being properly followed, as well as the track end.

The lengthwise position of the card relative to the read beam can be established by reference to control tracks on the data card. An optional position encoder, which includes a fixed member 92 and a movable member connected to the carriage adjacent to fixed member 92, serves to give the position of the carriage. The two members have very closely spaced markings, such as rulings produced on a grating. Line crossings are then counted from a start position to establish the carriage position in the Y direction. Optical limit switches, such as switch 96, signal the furthest desired limits of the movable member 92 and disable further translation of the carriage. At those positions, the direction of motor 50 is reversed if further carriage motion is desired. Motor 50 can move the card incrementally either at low speed or high speed.

With reference to FIG. 1a, arm 70 is seen carrying light source support member 61, holding source 76 and a lens assembly 80. Lens assembly 80 includes focusing lens 102 mounted in a holder 104, as well as a cylindrical lens 106 mounted in a holder 108, giving an imaging pattern to the detector which is generally rectangular. The focal length of the focusing lens may be 4.5 mm, while the focal length of the cylindrical lens may be on the order of 60 mm. Beam 110 is specularly reflected from reflective data card 66 and the retro-reflected light is deflected by beam splitter 112 onto mirror 114, mirror 116 and then to CCD detector 118, nominally having 256 cells in a linear array. Actuator arm 70 supports both the laser 76 and detector 118 in a reflective bounce relation relative to the data card 66. The lens assembly 80 has a magnification of four from card to detector. The size of each imaged spot is about 0.7 mm by 0.01 mm.

Figure 2:
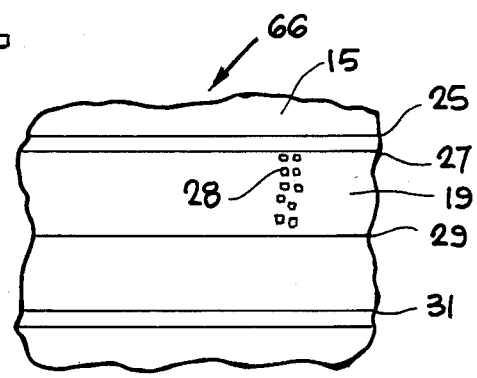
FIG. 2 is a frontal blow up view of a data strip having optically readable digital data thereon.

FIG. 2 shows a detail of a strip of optical data on the card 66. The card has a strip edge 25 a few millimeters from the upper edge of the card. The optical data strip spans the length of the card, similar to a magnetic data strip on a credit card. Inward from edge 25 is a first data area or band 19 between parallel lines 27 and 29. A second data area or band exists between lines 29 and 31. The second data area or band is approximately the same size as the first. The lines 27, 29 and 31 are dark, straight, parallel, spaced apart lines which assist in playback of information. Any number of such data areas may be disposed on a data strip, depending upon its width. The width of each data area is governed by the size and number of cells disposed across the area. At least one band passes beneath the readout head. In the case of multiple, parallel bands, the detector array overlaps bands, as described below. A small quantity of spots 28 is shown. Here, the spots are disposed in two rows across the first data recording area. The spots are microscopic in size, typically having a dimension greater than 3 microns, with the preferred dimension being about 10 microns, and a range of dimensions for an edge or diameter being between 1 to 50 microns.

Figure 3:
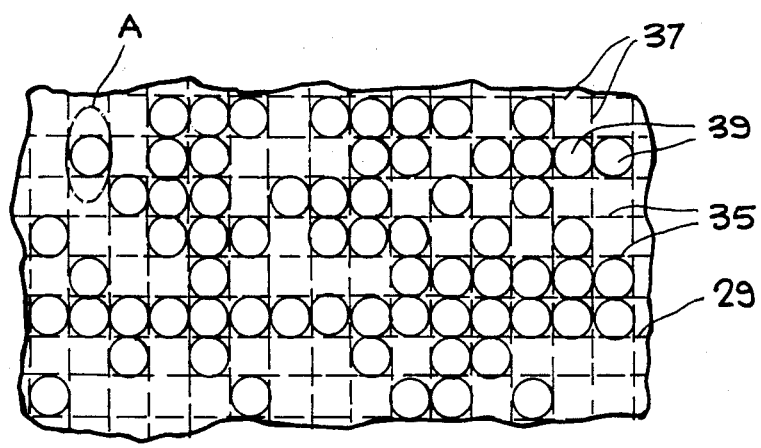
FIG. 3 is a plan view of data spots arranged in cells within the data strip of FIG. 2.

The data spots and their positions may be seen in FIG. 3. The dashed horizontal lines 35 and the dashed vertical lines 37 are imaginary, serving to indicate cells wherein data is written either photographically or by means of a laser. The cells are generally square, although this is not necessary. Within the cells, spots 39 may be present or absent. The field in which the spots appear is reflective. The presence of a spot diminishes the reflectivity of the field to an extent that a detector can detect diminished reflectivity and produce a corresponding signal. Previously described solid line 29 is seen defining the edge of a band.

The spots need not be round, as shown, but may have any regular shape, such as square. There is no required number of cells in a row and no required numbers of columns of cells between spaced apart parallel lines. However, the number of cells in each row is preferably equal. Preferably, the spots are positioned such that they touch each other when adjacent, i.e. contiguous, in lateral and lengthwise directions.

One of the advantages of the aforementioned laser recording and data storage material which is made from a silver-halide emulsion is that photographic prerecording of data spots is possible. For example, U.S. Pat. No. 4,304,848 describes a process in which data is replicated onto the material prior to achieving a reflective state. First, an unexposed silver-halide emulsion is exposed through an opaque master having data to be recorded on the medium and then the exposed areas are developed black, but not fixed. Next, the surface of the remaining silver-halide emulsion is fogged to create silver precipitating nuclei. Finally, the now-fogged medium is exposed to a monobath which slightly chemically develops the emulsion and solubilizes silver halide into silver complexes and transports soluble silver complexes by diffusion transfer to the silver precipitating nuclei where the silver is reduced on the nuclei, as in physical development, so as to create a reflective silver surface region. By this process, low reflectivity data spots appear in a reflective field. An inverse process could have been used such that the spots appear reflective, against a dark field. The microscopic data spots may be photographically pre-recorded or may be formed by laser writing. For this reason, the size of the microscopic spots is approximately equal to the diameter of a sharply focussed laser beam.

Figure 4:
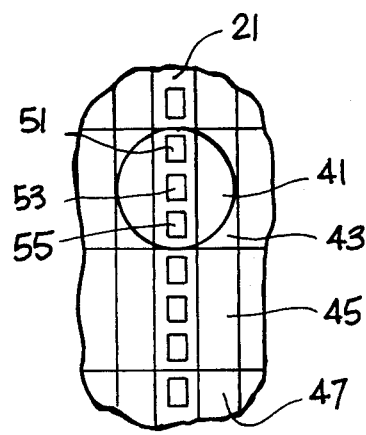
FIG. 4 is a detail of detector cells aligned for reading data spots in accord with the present invention.

FIG. 4 shows a linear detector array 21 of the CCD type, supported by the cantilever arm, passing over a portion of a grid having the data spot 41 within data cell 43. Data cells 45 and 47 are empty, as well as the other data cells which are pictured.

The linear detector array 21 has a plurality of detector elements 51, 53, 55 disposed for sensing light reflected from each cell. In this case, three detector elements observe cell 43 and in the process detect spot 41. Since the detector elements are CCD devices, the detector output is sensed by shifting charge levels from one end of the linear array to the other. By using plural detector elements to observe a single data cell, there is an opportunity to compensate for small particles or misalignments which might cause a misinterpretation of the cell contents. For example, if two of three elements report a data spot, with the third element reporting no data spot, the information can be processed as a reading error.

Figure 5:
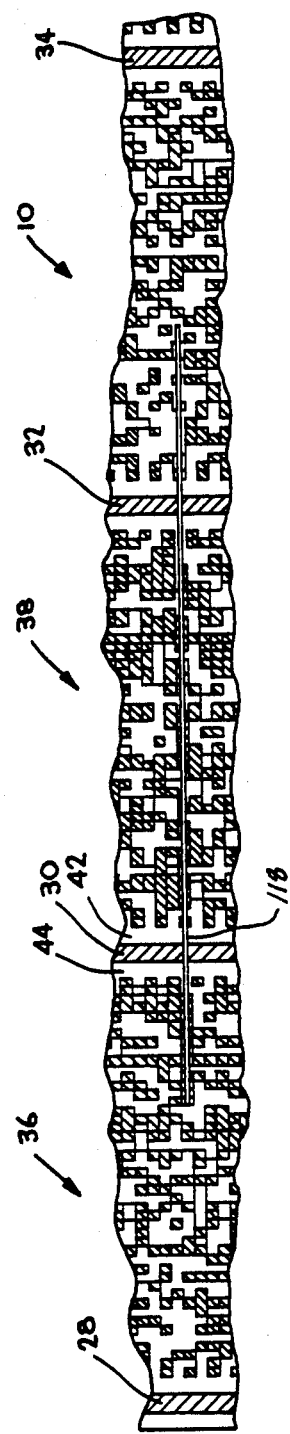
FIG. 5 is a plan view of data spots in a central band and neighboring bands, with a CCD array spanning the central band and portions of the neighboring bands.

With reference to FIG. 5, a portion of a data card is shown with three adjacent bands of data spots including central band 38 and neighboring bands 36 and 10. Band 36 is between parallel lines 28 and 30. Band 38 is between parallel lines 30 and 32. Band 10 is between parallel lines 32 and 34. Each band of data has 46 data cells between the white columns immediately adjacent to the parallel lines on either side of a band. The linear detector array 118 has a total of 256 detector cells uniformly spaced along the array. In reading data the detector array is over-filled with one complete track between lines 30 and 32, plus track portions of laterally adjacent tracks from neighboring bands. Approximately one-half of each neighboring track in laterally adjacent bands 36 and 10 is captured, as well as the entirety of a track in the central band 38, which is primarily of interest. The linear detector array is read several times in the same location so that ambiguities may be resolved by comparing successive reads of the same row. This is described further below. The central band 38 may be followed electronically by identification of the parallel lines 30 and 32, each having white columns on either side of the line, such as the columns 42 and 44 and data bits forming track marks at the end of each row. The track marks may indicate track numbers so that the address of each track is established. Once a band is read, such as band 38, the card, or the optics disposed above the card may be moved so that the next band of data may be read. This constitutes electronic tracking of data with very fine separation of relevant data from other data or non-data areas of the card.

In operation, the card and carriage are moved back and forth in the X direction by motor 50 in a continuous manner, with tracks being read successively by the CCD array. Alternatively, tracks may be addressed and brought beneath the detector assembly by action of motor 50 for random access.

In the preceding description, the apparatus has been described with reference to a reflective data card. The invention also may be used with a transmissive card. Such a situation is illustrated in FIGS. 6 and 7 wherein electromagnetic actuator 168 supports movable arm 170 having optics assembly 172 mounted thereon. This assembly includes a light source 176 and focusing optics 180. A bracket 182 connected to a side of the assembly supports CCD detector array 184, below an imaging lens, not shown. This array is below the focusing lens 180 to receive a beam of light passing through data card 188, represented by beam 186. The detector array 184 moves with optics assembly 182 so that the detector is always in a position to receive light from source 176 passing through the card. As previously mentioned, the beam illuminates a track at a time and the detector array is used to read a track at a time.

As previously mentioned, the card is supported on a movable carriage 192 which is carried on rails 194 and 196. Operation of the system is identical to the description provided with reference to FIG. 1.

An advantage of the present invention is that data may be read quickly and accurately with a relatively low-cost transport mechanism.

What is claimed is:

1. In an optical data card random access information system of the type having a data card with information written thereon in tracks of limited length the improvement comprising, an electromechanical actuator supporting an arm carrying a light source and a CCD linear array detector arranged in a light generation and detection relation relative to the data card, the detector arranged to be parallel to the data tracks and capable of imaging at least one track onto the linear array for simultaneously reading said track, said CCD detector being stationary when imaging said track, said CCD array detector having a plurality of detector elements, a plurality of said elements imaging each data bit recorded on said data track.

2. The information system of claim 1 wherein said actuator is movable on command for positioning the detector in locations repeatedly imaging different tracks onto the detector.

3. The information system of claim 1 wherein said CCD linear array detector is mounted on said arm on the same side of said data card as said light source, said data card being optically reflective.

4. The information system of claim 1 wherein said CCD linear array detector is mounted on said arm on the opposite side of said data card from said light source, said data card being optically transmissive.

* * * * *